A. W. WIGGLESWORTH.
TURRET MACHINE.
APPLICATION FILED NOV. 19, 1907.

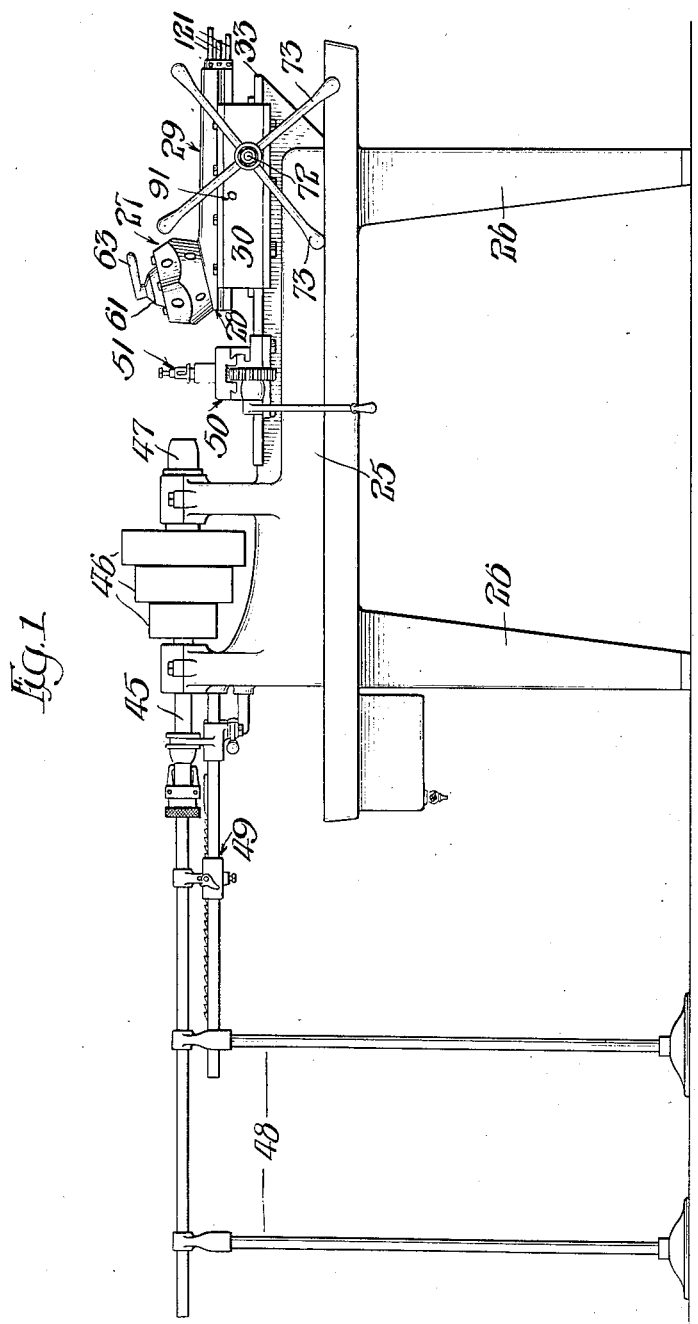

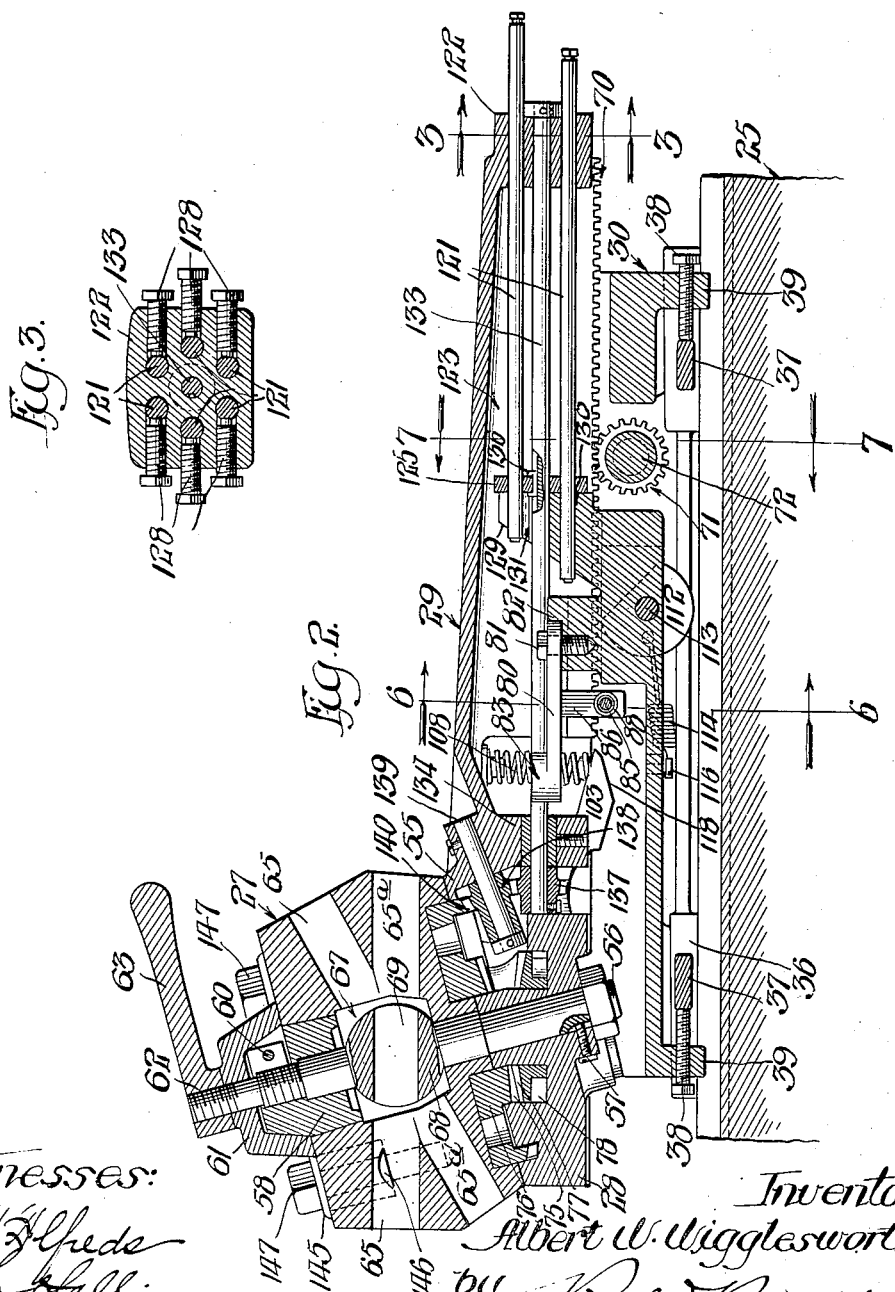

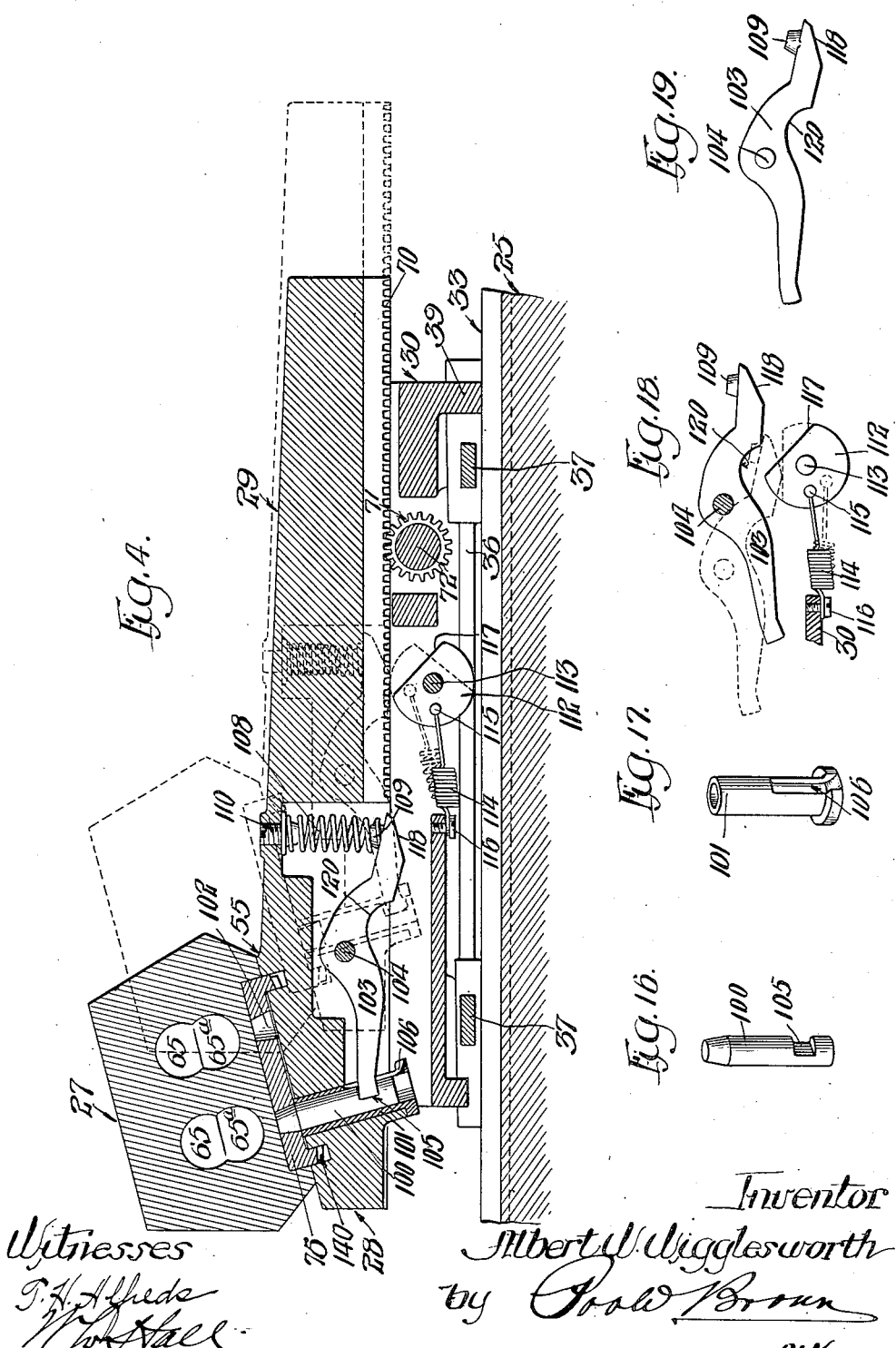

969,433.

Patented Sept. 6, 1910.

6 SHEETS—SHEET 4.

Witnesses:

Inventor
Albert W. Wigglesworth
by Poole & Brown
Attys

A. W. WIGGLESWORTH.
TURRET MACHINE.
APPLICATION FILED NOV. 19, 1907.
969,433.
Patented Sept. 6, 1910.
6 SHEETS—SHEET 5.
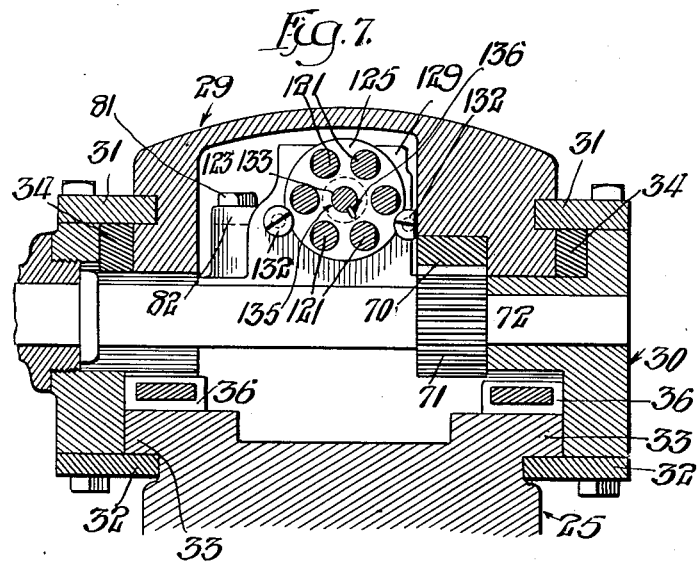
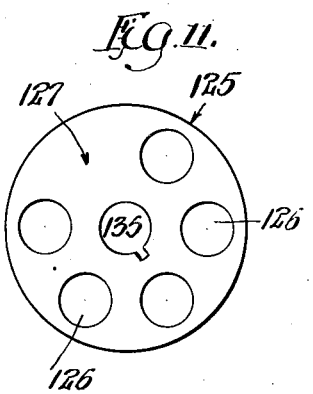
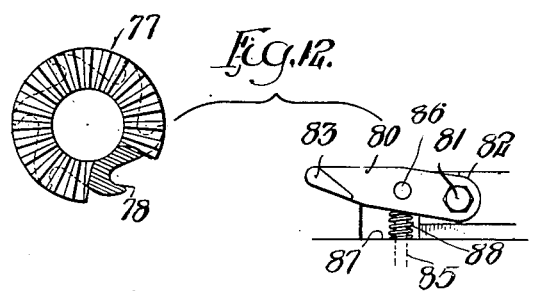
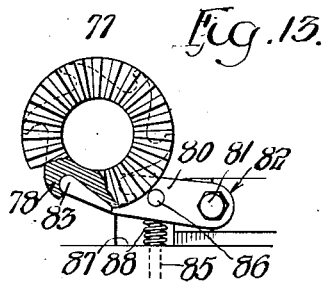
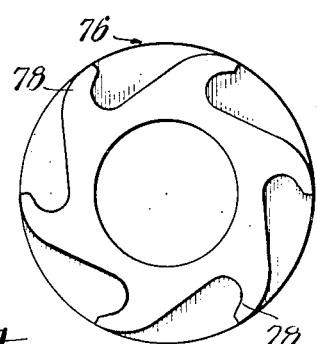
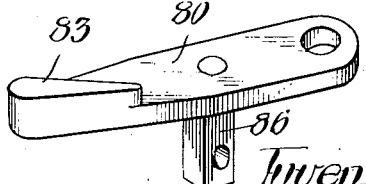
Inventor
Albert W. Wigglesworth
by Rose Brown
Attys.
Witnesses:

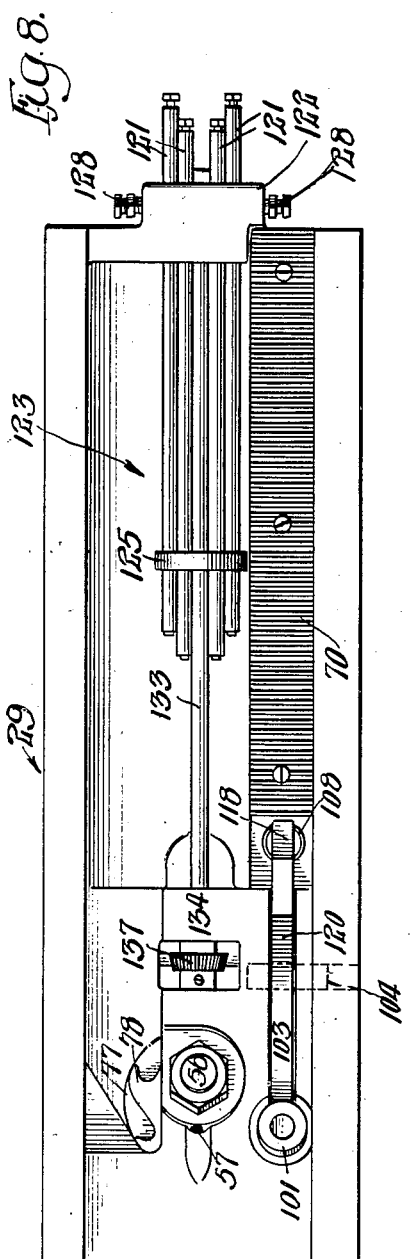
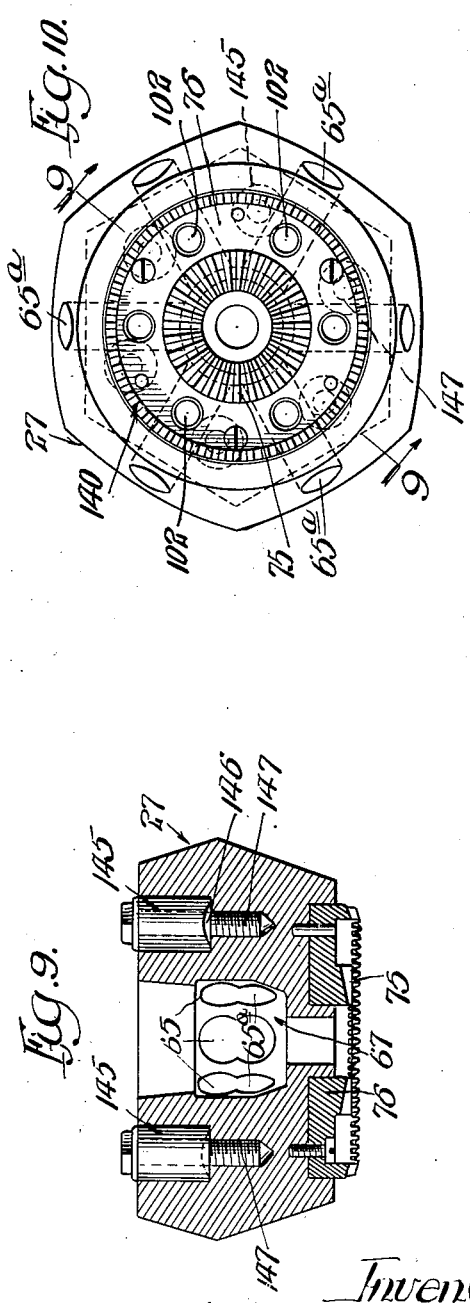

UNITED STATES PATENT OFFICE.

ALBERT W. WIGGLESWORTH, OF CHICAGO, ILLINOIS.

TURRET-MACHINE.

969,433. Specification of Letters Patent. Patented Sept. 6, 1910.

Application filed November 19, 1907. Serial No. 402,800.

*To all whom it may concern:*

Be it known that I, ALBERT W. WIGGLESWORTH, a citizen of the United States, and a resident of Chicago, in the county of Cook and State of Illinois, have invented certain new and useful Improvements in Turret-Machines; and I do hereby declare that the following is a full, clear, and exact description thereof, reference being had to the accompanying drawings, and to the letters of reference marked thereon, which form a part of this specification.

This invention relates to improvements in turret machines adapted for machining, screw-threading and otherwise manipulating round bar stock for making bolts, studs and the like, and the invention consists in the matters hereinafter set forth and more particularly pointed out in the appended claims.

Among the objects of my invention is to so construct and arrange the tool carrying turret that the tools carried thereby are swung away from the plane of the turret support or slide, as the tools are angularly shifted, through rotation of the slide, from the position which they occupy when presented to the work to their inoperative positions so that tools of varying diameters will amply clear the turret slide or support when shifted to their inoperative positions, and without the necessity of raising the turret substantially above the level of the turret slide or support.

A further object of the invention is to provide a turret having sockets so arranged that work entering a hollow tool carried by the turret, as a screw-cutting die may pass entirely through the turret without obstruction by any of the other tools carried by the turret.

A further object of the invention is to improve the mechanism for operating and controlling the turret and to otherwise improve the construction of machines of this general class.

Figure 5:
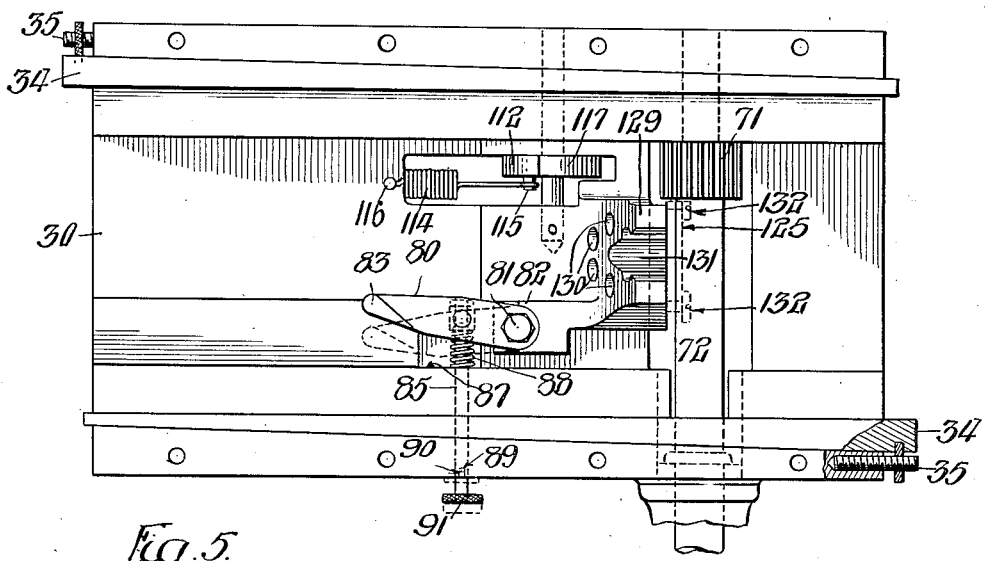
Figure 6:
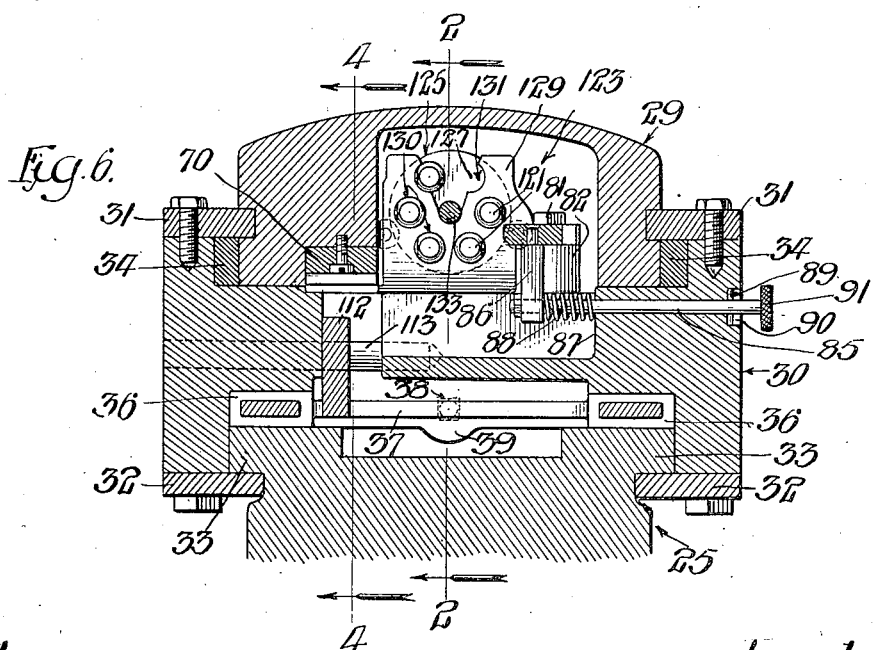

As shown in the drawings:—Figure 1 is a side elevation of a turret machine embodying my improvements. Fig. 2 is a longitudinal vertical section, taken on line 2—2 of Fig. 6. Fig. 3 is a transverse vertical section, taken on line 3—3 of Fig. 2. Fig. 4 is a longitudinal vertical section, taken on line 4—4 of Fig. 6. Fig. 5 is a top view of the saddle on which the slide is supported, showing a portion of the mechanism for controlling the slide. Fig. 6 is a transverse section, taken on line 6—6 of Fig. 2. Fig. 7 is a transverse section, taken on line 7—7 of Fig. 2. Fig. 8 is a bottom plan view of the turret slide and the parts carried thereby. Fig. 9 is a section, taken on line 9—9 of Fig. 10. Fig. 10 is a bottom plan view of the turret and its gear. Fig. 11 is a face view of a stop-plate hereinafter to be described. Fig. 12 illustrates the essential parts of the mechanism for giving intermittent rotation to the turret. Fig. 13 illustrates said mechanism in a different position. Fig. 14 is a bottom plan view of the turret driving gear ratchet wheel constituting part of said mechanism. Fig. 15 is a perspective view of the pawl for imparting intermittent rotation to the turret ratchet wheel. Fig. 16 is a perspective view of a stop-pin which operates to arrest the turret after each step of its intermittent rotation. Fig. 17 is a perspective view of the bushing in which said stop-pin is mounted. Fig. 18 is a view of the tripping device for releasing the stop-pin from the turret. Fig. 19 is a tripping lever coöperating with said pin and tripping device.

As shown in the drawings, 25 designates the bed casting of the machine supported on standards 26, 26.

27 designates a rotatable tool holding turret which is rotatively mounted on the rear or inner end 28 of the turret slide 29. Said turret slide 29 is mounted on slides arranged longitudinally of a saddle 30 which is fixed to the bed by upper and lower holding plates 31, 32, the latter fitting under side, longitudinal flanges 33 of the bed and the former engaging guide grooves in the lateral faces of the slide. Tapered gibs 34 hold the slide in lateral adjustment on the saddle, said gibs being adjusted and locked in their adjusted positions through the medium of studs 35, 35, which have screw-threaded engagement with the saddle and with peripherally knurled rotative disks which have interlocking engagement with the gibs as shown most clearly in Fig. 5. Other gibs 36, 36 are interposed between the saddle and bed to vertically adjust the saddle and the bed carried thereby. The said gibs 36 are connected at their ends by cross-bars 37 and are held in adjusted positions through the medium of screw-bolts 38 which have screw-threaded engagement with flanges 39 depending from the ends of the saddle and bear at their inner ends against said cross-bars.

45 designates the usual hollow, rotative spindle, through which the work to be machined is guided and advanced. Said spindle is provided with the usual belt pulleys 46 and at its inner end with a collet 47 through which the work, as a rod or bar, extends toward the turret.

48 designates work supporting standards having guide openings in their upper ends and arranged to support and guide the work, and 49, designates as a whole a work feeding mechanism which may be of any preferred construction.

50 designates as a whole a slide rest and its operating mechanism which is mounted on the bed between the turret and the collet 47 and carries one or more tool posts 51 on which are supported the tools for cutting the stock being machined or otherwise manipulating the same.

The present invention relates to the construction and arrangement of the turret and turret slide, and means for giving motion to and controlling the operation of the turret and turret slide. The other parts of the machine, so far as is concerned the specific construction thereof, may be of any well known or preferred arrangement and need not be further herein described.

In accordance with one feature of my invention, the turret 27 is mounted to rotate about an axis which is inclined rearwardly relatively to the path of reciprocal travel of the turret and slide and the radial tool receiving sockets of the turret, which are disposed in uniform angular relation to the turret, are disposed at such angles to each other and to the plane of rotation of said turret that, when the turret is rotated to present a given tool carried thereby to the work, said tool is disposed horizontally or at other proper angle to the work, and when the turret is rotated to carry such tool away from the work, the tool assumes an upwardly and outwardly inclined position so as to clear the turret slide in front of the turret. The purpose of this arrangement is to permit the use of tools of large diameter while, at the same time, giving ample clearance between the tools and the turret bed when the turret is rotated to carry the tools away from the work, and this result is accomplished without raising the turret to an objectionable height above the slide.

A further feature of my improvements, which coöperates with the described arrangement of the turret and the tool sockets thereof, is to provide said turret with bores disposed in line with said sockets and so arranged that each socket and its associated bore provides an opening which extends diametrically through the turret from side to side thereof. Thus when the turret is in position to present a given hollow tool to the work, as a thread cutting die, the stock being threaded or otherwise machined may pass through the hollow tool and its shank and through the associated or alined bore, while the turret carries its full complement of tools, and without the necessity of removing any of the tools.

Referring now to one approved form of construction by which these results are attained, the same is made as follows: The rear end or nose 28 of the turret slide is formed to provide a rearwardly and downwardly inclined seat 55 upon which the turret is supported, thereby giving the turret a rearwardly inclined or slanting position. The said turret is rotatively mounted on a shaft 56 which extends upwardly through said rear end of the turret slide at right angles to said seat 55 and is fixed to said slide in any suitable manner, as by the set-screw 57. The lower side of the turret has direct rotative bearing upon the shaft. The journal for the turret at the upper end of the shaft comprises a plug 58 which is seated in an enlarged bearing opening at the upper side of said turret and is fixed to the upper end of the shaft. As herein shown, said plug is formed at its upper end with a split, interiorly screw-threaded portion which engages screw-threads on said shaft, and said split, screw-threaded portion of the plug is clamped upon the shaft by means of a clamping bolt 60, as shown in Fig. 2. Fitted to the upper end of the shaft above said turret is a conical ring 61 which bears at its lower, larger end against the upper face of the turret and is pressed toward said turret by a nut 62 having screw-threaded engagement with the upper end of the shaft and provided with a handle 63 by which it may be conveniently turned on and off the shaft. Pressure of said nut 62, acting through said conical ring 61, holds the turret on its seat.

The turret is provided with a plurality of tool sockets 65, 65 into which are fitted the shanks of the tools which operate on the work presented thereto. As herein shown, the turret is provided with six angularly separated tool receiving sockets, whereby the turret is adapted to carry six working tools. The said tool sockets 65 are disposed in planes oblique to each other and to the plane of the turret, the arrangement being such that when one of the sockets and the tool mounted therein is presented to the work, the other sockets and the tools mounted therein are inclined obliquely upwardly from the plane of the socket directed toward the work. By reason of the inclination of the shaft 56 about which the turret rotates, each tool swings forwardly and upwardly from the horizontal as it is angularly shifted, by rotation of the turret, from its operative to its inoperative position, thereby giving ample clearance between the tools and slide as the tools are swung over said slide. It will thus be observed that a tool of much larger diameter may be employed than would be true if the turret were rotated on an axis at right angles to the reciprocal path of movement of the turret slide.

65ª 65ª designate the bores hereinbefore referred to which are located in axial alinement with said sockets and constitute, together with said sockets, through-openings in the turret for the purpose set forth. The turret is formed to provide at the inner ends of said tool sockets and between the same and said bores 65ª, a chamber 67. The turret shaft is provided in said chamber with an enlarged portion 68 having a horizontal through-opening 69 which is so located as to connect each of said sockets with its associated bore at the time the socket is in position to present the tool mounted therein to the work, as shown in Fig. 2. Thus it will be seen that when either one of the sockets 65 is located in alinement with the work, there is provided through the turret and shaft an unobstructed opening through which the work may extend; and that by reason of the fact that said tool sockets are disposed in different radial planes the tools carried by the several sockets will present no obstruction to the free passage of the work through a given tool and the turret when such tool is presented to the work being machined.

The turret and its slide are advanced toward and retracted from the work through the medium of a downwardly facing rack bar 70 carried by or formed on the lower side of the slide and a pinion 71 meshing therewith and fixed to a horizontal shaft 72 which extends transversely across and has bearing in the side members of the saddle (Figs. 2, 4 and 7). Said shaft is provided at its outer end with radial arms 73 by which the shaft is rotated to feed the slide toward the work and retract it therefrom.

Mechanism is provided which operates during the retractive movement of the slide to partially rotate the turret to angularly shift one of the tools carried thereby out of its operative position and to present the next succeeding tool to the work. Said mechanism is made as follows: The turret is provided on its under side with a downwardly facing, beveled gear 75 which is formed on a ring 76 that is seated and fixed in an annular groove in the lower face of the turret and projects a distance below the same. Said gear 75 meshes with a horizontal driving gear 77 formed on a ring that is rotatively mounted in a suitable annular, upwardly opening recess at the rear end of the turret slide and surrounding the turret shaft. By reason of the inclination of the horizontal driving gear to the turret gear, said gears mesh with each other through only a portion of their toothed faces, to wit,—the portion thereof in rear of the turret shaft. The said turret driving gear 77 is provided on its under face with a plurality of ratchet teeth 78 equal in number to the number of tool sockets of the turret. As herein shown, said ratchet teeth are formed integral with the driving gear. Said ratchet teeth are adapted for engagement, during the retractive movement of the turret slide, with a horizontally swinging pawl 80, located in rear of the turret and pivotally mounted by means of a screw-bolt 81 to a lug 82 rising upwardly from the stationary saddle 30, as most clearly shown in Figs. 2, 5 and 6. Said pawl 80 is provided at its rear end, on its upper face, with a tooth 83, shaped to properly enter the interdental spaces between the ratchet teeth. When the turret and its slide are retracted, therefore, the tooth 83 of said pawl engages with one of the ratchet teeth of the turret driving gear and rotates said driving gear and the turret an angular distance equal to the angular distance between two adjacent tool sockets, or one-sixth of a rotation as herein shown. In Fig. 12 is shown the relative positions of said ratchet wheel and pawl when the turret is at the rearward limit of its travel. In Fig. 13 is shown the relative positions of said parts when the turret is at the extreme forward limit of its travel and after the pawl has turned the ratchet wheel and the turret one-sixth of a rotation. Said pawl is mounted to swing toward and away from the ratchet wheel, under the influence of a spring device hereinafter to be described, whereby, when the turret slide again moves forwardly, the pawl swings laterally away from the ratchet-wheel to disengage itself from said wheel. The spring device herein shown for this purpose is made as follows: 85 designates a rod which extends horizontally through a bearing aperture at one side of the saddle and is connected at its inner end with a lug or arm 86 depending from said pawl between the ends thereof. Interposed between said lug or arm and an inwardly facing shoulder 87 on said saddle and surrounding said rod is a spiral, expansively acting spring 88 which normally holds the pawl with its tooth in the path of the ratchet wheel of the turret driving gear. Said rod is provided with a stop which limits the inward movement of the pawl under the action of said spring. Said stop consists, in the present instance, of a pin 89 extending transversely through the outer end of said rod and engaging a seat formed in the bottom of a recess 90 on the outer face of the saddle. When operating upon work requiring the use of but a single tool, the turret is not intermittently rotated, but the operation of the machine consists in advancing the single tool toward the work and retracting it therefrom. In this instance, the pawl and ratchet mechanism for effecting the intermittent rotation of the turret is thrown out of action. This is conveniently accomplished by drawing outwardly the rod 85 until the stop-pin 89 is beyond the plane of the side face of the saddle and thereafter turning the rod (it being rotatively connected with the pawl arm or lug) so as to bring said stop-pin in cross-wise relation to the recess 90, as indicated in dotted lines in Fig. 5. Said rod is provided at its outer end with a peripherally knurled knob 91 to facilitate the manipulation of the rod.

A locking device is provided for holding the turret stationary after it has been turned through a part of its rotation, and during the time the tool is operating on the work, and said locking device coöperates with means which operates prior to engagement of the pawl 80 with the ratchet wheel of the turret driving gear to release said locking device. The mechanism herein shown for locking and unlocking the turret is made as follows: 100 designates a reciprocating locking bolt that is mounted in a bushing 101 carried by the rear end of the slide beneath the turret. Said bolt is adapted for engagement at its upper end with a plurality of notches 102 at the under side of the turret, said notches being herein shown as formed in the turret gear ring 76. 103 designates a vertically swinging lever beneath the slide which is pivoted between its ends on a pivot pin 104 carried by said slide. The rear end of said lever engages a notch or recess 105 near the lower end of said reciprocating locking bolt, and the bushing or sleeve 101 is provided with a slot 106 through which said lever extends for engagement with said notch. A spiral expansively acting spring 108 is interposed between the heel of said lever and a downwardly facing shoulder on the slide, and operates through said lever to normally maintain the locking bolt in its locking position. Said spring is centered and held in place at its lower and upper ends, respectively, by a lug 109 on the lever, and a screw-threaded stud 110 extending downwardly through the upper wall of the slide. The lever is swung on its pivot against the action of the spring 108, to withdraw the locking bolt from the notches, just before the turret rotating mechanism is brought into action, by devices made as follows: 112 designates a vertically disposed tripping disk located in front of and in line with the stop-bolt actuating lever, and is rotatively mounted on a horizontal pin or stud 113 extending inwardly from the side wall of the saddle 30. 114 designates a spiral spring which is attached at one end, by means of a pin 115, to one side of said disk and at its other end by means of a pin 116 to the saddle at a point in rear of the disk. Said tripping disk is cut away on its periphery to provide a flattened surface 117. The said disk 112 is free to rotate on the pin 113 and the flattened peripheral part 117 thereof is so located with respect to the connection of the spring 114 with the disk that said disk, when free or unrestrained, is held by the spring 114 with the inclined portion 117 thereof facing forwardly, as shown in Figs. 2 and 4. The tripping lever 103 is provided at its heel portion with an inclined surface 118 which, when the slide is retracted under the action of the feed shaft 72, engages with the curved periphery of the disk with the result of throwing said heel portion upwardly past the disk and throwing the rear end of the lever downwardly in a manner to withdraw the locking pin or bolt 100. This action of the tripping lever occurs just prior to the engagement of the pawl 80 with the ratchet teeth 78, so that when said pawl strikes the ratchet wheel the turret is unlocked and free to be rotated or angularly shifted a distance of one-sixth or other required fractional part of a rotation thereof. The said bolt actuating lever is provided on its under margin with a curved recess 120 which permits the heel of the lever to swing downwardly as soon as the recessed portion of the lever is moved over the tripping disk. This operation occurs just after the pawl 80 is engaged with the turret driving gear ratchet wheel 77 and allows the upper end of the locking pin or bolt to be pressed against the under surface of the plain or unnotched part of the gear ring, so that as soon as the turret has passed through the angular movement necessary to bring another tool in position for operation on the work, the locking bolt is forced by the spring 108 into the proper locking notch of said gear and locks the turret in place. During the succeeding advance movement of the turret and its slide, the engagement of the recessed portion 120 of the lever with the disk, as the lever moves rearwardly over the disk, operates to turn the disk rearwardly in a manner to bring the flattened marginal portion 117 of the disk upwardly, as shown in Fig. 18, in which position the heel of the bolt actuating lever clears the disk and permits the lever to pass the same during such advance movement without withdrawal of the locking bolt. As soon as the heel of the lever has moved past the disk, the spring 114 restores the disk to its normal position.

A stop mechanism is provided for limiting the advance movement of the turret to correspond with the distances required to advance the several tools to the work (depending upon the character of the machine for which said tools are designed), and said stop mechanism is operated in suitable timing relation to the turret actuating mechanism so that the turret and slide and the tool presented for each operation will be arrested at the proper point to limit the operation of each tool on the work. Said stop mechanism is made as follows: 121, 121 designate a plurality of horizontal stop-rods which extend through openings in the solid front end portion 122 of the turret slide and rearwardly toward the turret. Said slide is cored out to provide a chamber 123 to receive the stop mechanism. There are a number of said stop-rods equal to the number of the tools carried by the turret and said rods are arranged in circular order at uniform angular distances apart, as shown most clearly in Fig. 7. 125 designates a stop plate provided with a plurality of apertures 126 and an imperforate stop portion 127. The number of said apertures is one less than that of the stop-rods and said apertures and the imperforate stop portion are so disposed about the axis of the plate that the stop portion is always in line with one of the stop rods while the apertures are in line with the remaining stop-rods. When the turret advances to present one of the tools carried thereby to the work all but one of the rods pass through the apertures alined therewith, while one of the rods strikes the imperforate stop portion and arrests the movement of the turret slide. The said stop-plate is rotated in unison with the turret by means hereinafter to be described, so as to present said stop portion thereof successively to the different rods whereby each rod, associated with a given tool carried by the turret, operates to arrest the turret at a point which is determined by the nature of the work done by said tool. That is to say, if six tools be employed which are to be successively applied to the work, six stop-rods will be employed, one appropriated to each tool, and the rotation of the stop-plate (or the equivalent rotation of the stop-rods relatively to a stationary stop-plate) serves to present the stop-portion 127 of said plate in line with the stop-rod the associated tool of which is in position for operation on the work, thereby arresting each tool at the proper predetermined point in its advance toward the work. Set-screws 128 (Fig. 3) are arranged to hold said rods in fixed relation to the slide and permit relative adjustment of said stop-rods whereby each rod may be arranged to arrest the turret and slide at varying points in the travel of the latter. One of the stop-rods will, therefore, be brought into contact with the stop-portion of the plate in each advance movement of the turret and slide and arrest the turret and the tool presented to the work at a point determined by the position of said stop. The other stop rods may or may not pass through the openings 126 of the stop-plate, depending upon whether or not the rear ends thereof are set in advance of the rod through the operation of which the turret and slide are to be arrested. The stop-plate is mounted upon and supported by an abutment 129 rising from the saddle into chamber 123 of said slide. The said abutment is formed to provide in rear of the stop-plate openings alined with all the stop-rods. As shown in Fig. 6, the said abutment is provided with four circular openings 130 and is provided with a notch 131 at its upper side of sufficient angular dimension to permit two of the stop rods to pass therethrough. Screws 132 which enter the front face of said abutment and the heads of which overlap the margin of said plate afford means by which the plate is held flat against said abutment.

As before stated, the number of the stop-rods in the machine are equal to the number of tools employed in the turret, and that each stop-rod is set or adjusted to correspond with the distance for the slide to move for the proper action of its corresponding tool carried by the turret. It becomes necessary, therefore, that the stop-plate 125 and the stop-rods be angularly shifted relatively to each other during each retractive movement of the turret slide in order that the imperforate portion 127° of said plate shall be in line with the stop-rod which corresponds to the tool which is next to be presented to the work. As herein shown, the stop-plate is rotated to produce this result by mechanism made as follows: 133 designates a rotative shaft which has bearing at its forward end in the thickened end portion 122 of the slide and at its rear end in a part 134 of said slide. The said shaft 133 extends through a central opening 135 of said disk or plate and the plate is fixed non-rotatively thereto by means of a key 136 or otherwise. The shaft is provided at its forward end with a beveled gear pinion 137 which meshes with a beveled idler gear 138 carried by a stud 139 fixed in the slide above the rear end of the shaft 133. The said beveled idler gear 138 meshes with a beveled gear 140 which, as herein shown, is formed on the marginal part of the ring 76 which carries the turret beveled gear 75. Thus it will be seen that when the slide and turret are retracted and the turret is rotated, through the pawl and ratchet mechanism before described, the rotation of said turret will impart, through said gear wheel 140, the idler 138 and the pinion 137 a rotary motion to the shaft 133. At this time the stop-rods are withdrawn from the apertures of said stop-plate, so that said disk is free to rotate in a manner to bring the imperforate stop portion thereof in line with another stop-rod. Such angular shifting or displacement of the stop-plate may be effected by rotating the plate one-sixth or other predetermined fractional part of a rotation in the direction toward the stop-rod which is next to be brought into action. By reason of the fact, however, that the necessary slow speed of the shaft 133 for such a short angular shifting of the stop-plate can be effected only at the expense of enlarging or multiplying the gears, I have found it convenient and desirable to rotate the stop-plate shaft 133 in a direction away from the stop-rod next to be brought into action, thus making it necessary to rotate said stop-shaft and plate five-sixths of a rotation in such backward direction, instead of one-sixth of a rotation in the more direct direction of rotation. This arrangement secured the same result, bringing the imperforate stop-porton of the stop-plate in line with the stop-rod next to be brought into action to arrest advance movement of the turret and slide.

The tools are locked in the tool sockets of the turret by means of hollow locking pins 145, shown in full lines in Fig. 9 and in dotted lines in Fig. 2, which extend downwardly through apertures which open from the top face of the turret at the sides of the sockets and partially intersecting said sockets. The said locking pins are provided at their lower ends, on the side thereof adjacent to the sockets, with segmental cylindric recesses 146 which coincide with the cylindric walls of the sockets and bear against the shanks of the tools. The hollow locking pins are clamped against the tool shanks by means of screw-bolts 147 extending axially therethrough at the sides of the sockets and having screw-threaded engagement with the body of the turret below the locking pins.

I claim as my invention:—

1. In a turret machine, a rotative turret provided with a plurality of tool sockets which are inclined with respect to the plane of rotation of said turret and provided with a plurality of radial bores, one in line with each socket, each socket and its associated bore being arranged to provide a straight passage through the turret, for the purpose set forth.

2. In a turret machine, a rotative turret having a plurality of tool sockets inclined with respect to the plane of rotation of the turret, the turret being also provided with a plurality of radial bores, one in line with each socket, the said bores opening into the side of the turret beneath the sockets.

3. In a turret machine, a turret which is rotatively mounted on an axis inclined toward the work and having a plurality of angularly separated upwardly inclined tool sockets, said turret being provided also with a plurality of angularly separated downwardly inclined bores arranged one in axial alinement with each tool socket, each tool socket and its associated bore constituting a straight passage or opening through the turret.

4. In a turret machine, a turret, its reciprocating slide and a shaft carried by the rear end of said slide on which said turret is supported, said turret being inclined rearwardly, the turret being provided with a plurality of radial tool sockets which are inclined upwardly with respect to the plane of rotation of the turret, and provided also with a plurality of radial bores disposed one in alinement with each of said sockets, said shaft being provided within the turret with an inclined opening arranged to aline with each tool socket and its associated bore.

5. In a turret machine, the combination with a rotative turret, its slide and a support on which said slide reciprocates, of a ratchet through the medium of which the turret is intermittently rotated, a pawl pivoted to said support, a spring acting on the pawl to normally hold the pawl in the path of the ratchet wheel, a spring pressed rod having rotative and sliding engagement with said support and rotatively connected at its inner end with the pawl, and a stop pin on the outer end of the rod adapted to normally engage the bottom of a recess in the outer face of the support to limit the swing of the pawl toward the ratchet wheel, the parts being so arranged that the rod may be drawn outwardly to swing the pawl out of the path of the ratchet wheel and turned to bring the stop pin in cross-wise relation to said recess and thus hold the pawl out of the path of the ratchet wheel.

6. In a turret machine, the combination with a reciprocating slide, a turret supported thereon and rotatable about an axis inclined to the path of said slide, and a stationary support on which said slide reciprocates, of means acting during the retractive movement of the slide for imparting intermittent rotation to the turret, said turret being provided at its lower side with a plurality of angularly separated notches, a locking bolt adapted to engage said notches to lock the turret from rotation, a vertically swinging lever connected with said locking bolt, a spring acting on the lever to normally hold said bolt engaged with said notches, a tripping device acting on said lever for withdrawing the bolt from said notches prior to the action of the turret rotating mechanism, and means whereby said locking bolt is released from the action of the tripping device prior to the arrest of the turret at each intermittent rotation thereof.

7. In a turret machine, the combination with a rotative turret, its reciprocating slide and a support on which said slide reciprocates, of means operating during the retractive movement of the slide for imparting intermittent rotation to the turret, said turret being provided with a plurality of angularly separated stop notches, a locking bolt adapted to engage said notches for locking the turret from rotation, a lever pivoted between its ends to the slide and connected at one end with the bolt, a spring acting on said lever to normally hold the bolt engaged with said notches, and a rotative tripping device on said support in front of the lever having an irregular periphery adapted to be engaged by the free end or heel of said lever to withdraw said bolt from said locking notches, the lever being provided in rear of said free end or heel with a recess arranged to permit the free end of the lever to be swung toward the tripping device prior to the end of the retractive movement of the slide and thus release the stop bolt from the tripping device.

8. In a turret machine, the combination with a rotative turret, its reciprocating slide and a support on which said slide reciprocates, of means operating during the retractive movement of the slide for imparting intermittent rotation to the turret, said turret being provided with a plurality of angularly separated stop notches, a locking bolt adapted to engage said notches for locking the turret from rotation, a lever pivoted between its ends to the slide and connected at one end with the bolt, a spring acting on said lever to normally hold the bolt engaged with said notches, a rotative tripping device on said support in front of the lever having an irregular periphery adapted to be engaged by the free end or heel of said lever to withdraw said bolt from said locking notches, the lever being provided in rear of said free end or heel with a recess arranged to permit the free end of the lever to be swung toward the tripping device prior to the end of the retractive movement of the slide and thus release the stop bolt from the tripping device, and means for preventing the withdrawal of the locking bolt away from the turret during the succeeding advance movement of the slide, for the purpose set forth.

9. In a turret machine, the combination with an intermittently rotative turret and a locking device therefor comprising a swinging lever provided at one end with a locking device adapted to separately engage one of a plurality of locking notches on the turret, a spring acting on the lever for holding said locking device engaged with said notches, and a rotative tripping device, relatively to which said lever is movable, and acting through said lever to withdraw said locking device from said notches, said tripping device having a flattened peripheral portion arranged to permit the lever to pass the same in one direction of relative movement of the lever and tripping device without withdrawing said locking device.

10. In a turret machine, the combination with an intermittently rotative turret and a locking device therefor comprising a swinging lever provided at one end with a locking device adapted to separately engage one of a plurality of locking notches on the turret, a spring acting on the lever for holding said locking device engaged with said notches, a rotative tripping device, relatively to which said lever is movable, and acting through said lever to withdraw said locking device from said notches, said tripping device having a flattened peripheral portion arranged to permit the lever to pass the same in one direction of relative movement of the lever and tripping device without withdrawing said locking device, said tripping device being free to rotate about its axis, and a spring acting on said tripping device to normally maintain it in the path of said lever.

11. In a turret machine, the combination with a rotative turret, its reciprocating slide and a support on which said slide reciprocates, of means acting during the retractive movement of the slide for imparting intermittent rotation to the turret, said turret being provided with a plurality of angularly separated locking notches, a locking bolt adapted to engage said notches to lock the turret from rotation, a swinging lever connected at one end with the bolt, a spring acting against said lever for holding the bolt engaged with said rotative notches, and a rotative tripping device in the path of said lever and arranged to be engaged by said lever during the retractive movement of the slide for withdrawing the locking bolt from the turret locking notches, said tripping device being provided with a peripheral flattened portion arranged to permit the lever to pass the tripping device during the advance movement of the slide without actuating said locking bolt.

12. In a turret machine, the combination with an intermittently rotative turret, its reciprocating slide and a support on which said slide reciprocates, said turret being provided with a plurality of angularly separated locking notches, a locking bolt adapted to engage said notches to lock the turret from rotation, a lever pivoted beneath said slide and connected at one end with the bolt, a spring acting against the lever for normally holding the bolt engaged with one of the notches, and a rotative, spring-pressed tripping device in front of said lever on said support arranged to be engaged by the heel of said lever during the retractive movement of the slide for withdrawing the locking bolt from the turret notches, said tripping device being provided with a forwardly facing peripheral flattened portion whereby, when the slide is advanced, the engagement of the lever with said tripping device rotates the latter to present the flattened portion thereof to the heel of the lever, whereby withdrawal of the bolt during the advance movement of the slide is prevented.

In testimony, that I claim the foregoing as my invention I affix my signature in the presence of two witnesses, this 31st day of October A. D. 1907.

ALBERT W. WIGGLESWORTH.

Witnesses:
W. DÜTURTH,
W. L. HALL.